United States Patent [19]
Siegel et al.

[11] Patent Number: 5,320,800
[45] Date of Patent: Jun. 14, 1994

[54] NANOCRYSTALLINE CERAMIC MATERIALS

[75] Inventors: Richard W. Siegel, Hinsdale; G. William Nieman; Julia R. Weertman, both of Evanston, all of Ill.

[73] Assignees: ARCH Development Corporation, Chicago; Northwestern University, Evanston, both of Ill.

[21] Appl. No.: 86,387

[22] Filed: Jun. 30, 1993

Related U.S. Application Data

[63] Continuation of Ser. No. 622,244, Dec. 4, 1990, abandoned, and a continuation-in-part of Ser. No. 466,585, Dec. 5, 1989, Pat. No. 5,128,081.

[51] Int. Cl.$^5$ ................................................ B22F 3/02
[52] U.S. Cl. ..................................... 419/66; 148/514
[58] Field of Search .................... 419/23, 66, 6, 19; 148/514; 75/245, 247; 428/547

[56] References Cited

U.S. PATENT DOCUMENTS

| | | | |
|---|---|---|---|
| 4,389,250 | 6/1983 | Melton et al. | 75/232 |
| 4,594,104 | 6/1986 | Keybould | 75/243 |
| 4,596,746 | 6/1986 | Morishita et al. | 428/458 |
| 4,654,229 | 3/1987 | Morita et al. | 427/180 |
| 4,683,118 | 7/1987 | Hayashi et al. | 419/23 |
| 4,909,840 | 3/1990 | Schlump | 75/232 |
| 5,049,355 | 9/1991 | Gennari et al. | 420/425 |

*Primary Examiner*—Behrend E. Harvey
*Assistant Examiner*—Ngoclan T. Mai
*Attorney, Agent, or Firm*—Reinhart, Boerner, Van Deuren, Norris & Rieselbach

[57] ABSTRACT

A method for preparing a treated nanocrystalline metallic material. The method of preparation includes providing a starting nanocrystalline metallic material with a grain size less than about 35 nm, compacting the starting nanocrystalline metallic material in an inert atmosphere and annealing the compacted metallic material at a temperature less than about one-half the melting point of the metallic material.

3 Claims, 9 Drawing Sheets

NANOCRYSTALLINE CERAMIC MATERIALS

This invention was made with Government support under Contract No. W-31-109-ENG-38 awarded by the Department of Energy. The Government has certain rights in this invention.

This invention was made with Government support under Grant Number: NSF-DMF 8320157 awarded by the National Science Foundation. The Government has certain rights in this invention.

This is a continuation of Ser. No. 07/622,244, filed Dec. 4, 1990, now abandoned, and a continuation-in-part of Ser. No. 07/466,585, filed on Dec. 5, 1989, now U.S. Pat. No. 5,128,081.

The present invention is generally related to methods and products of manufacture and use of ultrafine-grained, or nanocrystalline, metallic materials. More particularly, the invention is related to methods of controlling the grain sizes, chemical phases produced, levels of porosity, and the electrical, mechanical, magnetic and chemical properties of nanocrystalline metallic materials.

Technological Progress is often based on the availability of new and improved materials which enable increasing the performance of new products or new methods of manufacture. For example, the discovery of the class of high temperature superconducting ceramics has given rise to numerous possible new products and new manufacturing methods. Frequently, progress in new material developments arises from the discovery of new chemical compounds or more sophisticated methods of manufacturing products, such as, new methods of miniaturization for use in integrated circuit manufacture. Recently, methods have been developed for controllably producing ultrafine-grained, or nanocrystalline, materials (typically, about 1-100 nm grain diameters). These new methods have made possible the production of new materials having substantially different physical and chemical properties than the large grained, or single crystal, counterparts having substantially the same chemical composition. Numerous traditional problems in areas such as ceramic materials can now be addressed using these new nanocrystalline materials to control and modify materials properties.

It is therefore an object of the invention to Provide improved methods and products of manufacture of nanocrystalline materials.

It is another object of the invention to provide a novel method of preparing a product nanocrystalline material using variable gas pressure atmospheres.

It is a further object of the invention to provide an improved method of manufacturing any electronic components encompassing different nanocrystalline or nanophase materials.

It is an additional object of the invention to provide a new method of preparation and product nanocrystalline metallic material.

It is also an object of the invention to provide new nanocrystalline and nanophase materials for magnetic materials applications.

It is another object of the invention to provide novel products of metallic nanocrystalline Pd and Cu.

It is a still another object of the invention to provide an improved method of using nanocrystalline metallic materials.

It is yet another object of the invention to provide a novel method of producing a nanocrystalline metallic material having predetermined sintering characteristics.

It is still an additional object of the invention to provide an improved method of mechanical processing of a nanocrystalline metallic material, while controlling mechanical properties by adjustment of grain size.

It is yet another object of the invention to provide a method of manufacturing nanocrystalline zinc oxygen compounds for use in varistors.

It is still another object of the invention to provide new forms of nanocrystalline titanium oxide sensors.

Further objects and advantages of the invention together with the organization and manner of operation thereof, will become apparent from the following detailed description of the invention when taken in conjunction with the accompanying drawings and nonlimiting examples.

BRIEF DESCRIPTION OF THE DRAWINGS

FIG. 2A is for titanium evaporated in 60 Pa of helium and compacted without any exposure to oxygen; FIG. 2B is for titanium evaporated in 60 Pa of helium and exposed to oxygen prior to compaction and the shaded peaks arise from an unidentified phase or phases of titanium and oxygen; and FIG. 2C is for titanium evaporated in 500 Pa of helium followed by exposure to oxygen to produce rutile;

DETAILED DESCRIPTION OF PREFERRED EMBODIMENTS

Figure 1:
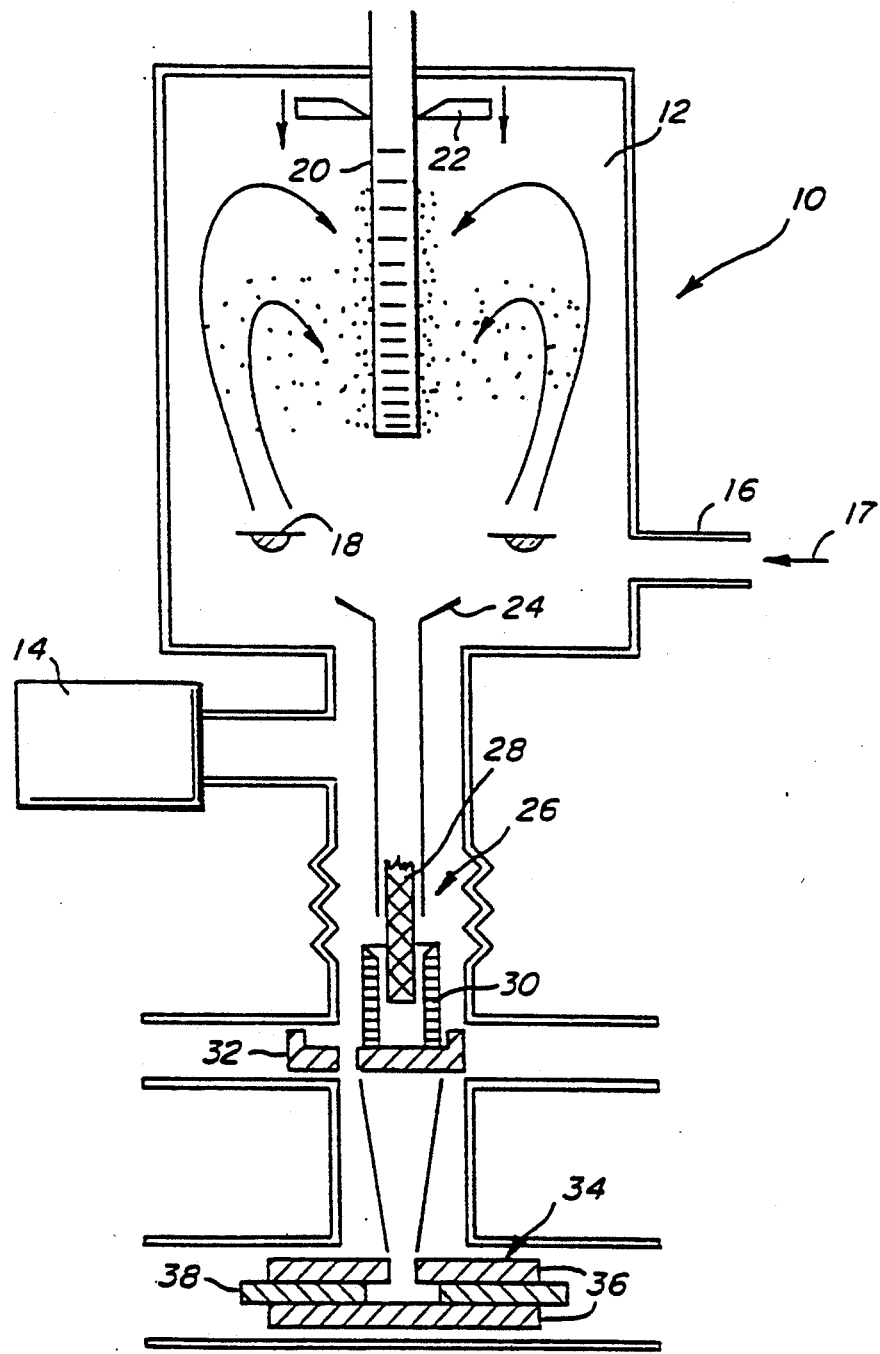
FIG. 1 shows one form of apparatus used for producing nanocrystalline materials.

An apparatus for preparation of nanocrystalline or nanophase materials (hereinafter, "nanocrystalline" materials shall include crystalline, quasicrystalline and amorphous phases) is shown in FIG. 1 at 10. The apparatus 10 includes a vacuum chamber 12 wherein a vacuum (preferably, better than about $10^{-6}$ Pa) is achieved by any one of a variety of conventional pumping systems 14. In other forms of the invention the vacuum can be about $10^{-4}$ Pa and useful product materials are still obtained. After evacuation, the vacuum chamber 12 is back-filled through gas port 16 with selected gases 17, such as, inert gases, oxidizing gases (such as oxygen and air and mixtures of oxidizing and inert gases) which are utilized for carrying out various processing steps.

In the case of preparing oxides of titanium in the apparatus 10, initially a helium gas atmosphere is provided while a titanium metal source 18 (typically greater than 99.9% pure) is evaporated by conventional Joule heating. In other forms of the invention, the titanium can be removed from a source by other conventional means, such as electron beam, sputtering, RF or plasma heating, or laser beam irradiation. The evaporated titanium condenses into small particles in the helium atmosphere and is transported by convection currents to a liquid nitrogen cooled cold surface 20 where the condensed titanium accumulates. In other forms of the invention, forced gas flow can be used to assist in directly accumulating the material in a compaction device. Further, the material removed from the source can be deposited on an ambient temperature surface in a nanophase or nanocrystalline form.

In a preferred form of the invention, the accumulated titanium can be oxidized to form a nanocrystalline titanium oxide material. Further, in other forms of the invention, the titanium can be oxidized before or after removing the titanium from the cold surface 20. The resulting phases of titanium oxide and their properties depend on the gases used and the chosen point of oxidation in the manufacturing process. In further embodiments to be described hereinafter, various nanocrystalline metals produced in an apparatus such as 10, can be subjected to a generically oxidizing atmospheres, such as C, S, N, F, or Cl to form nanocrystalline materials.

Once sufficient nanocrystalline titanium oxide material has accumulated on the cold surface 20, a scraping device 22 (typically a ring of "Teflon"—a trademark of Du Pont Corp) removes the titanium oxide material. The removed titanium oxide falls into funnel 24 and is collected in a low pressure compaction unit 26. This low pressure compaction unit 26 includes a piston 28, an anvil portion 30 and a slide section 32. Further compaction of the nanocrystalline titanium oxide material can be carried out by using a high pressure compaction unit 34, including sleeve 36 and piston 38. All of the collection and compaction steps can be performed in a highly controlled vacuum or gas atmosphere depending on the properties desired for the resulting nanocrystalline end product.

During typical manufacture of nanocrystalline materials, the evaporation pressure (or the background partial pressure from "removal" of the desired chemical species from a source) is roughly 5-50 Pa. In the case of evaporating the titanium source 18, the pressure is about 10 Pa while the helium gas pressure is controlled to select the desired phase of titanium oxide. For example, in order to reliably attain the rutile phase of nanocrystalline oxide in the illustrated apparatus 10, the helium gas pressure is maintained above about 500 Pa. In order to ultimately produce an amorphous titanium oxide material, the helium gas pressure is kept between about 10-500 Pa when collecting titanium on the cold surface 20. A coarse grained titanium (and ultimately oxidized to rutile) is achieved by using helium gas pressures below about 10 Pa within the apparatus 10.

Figure 2:
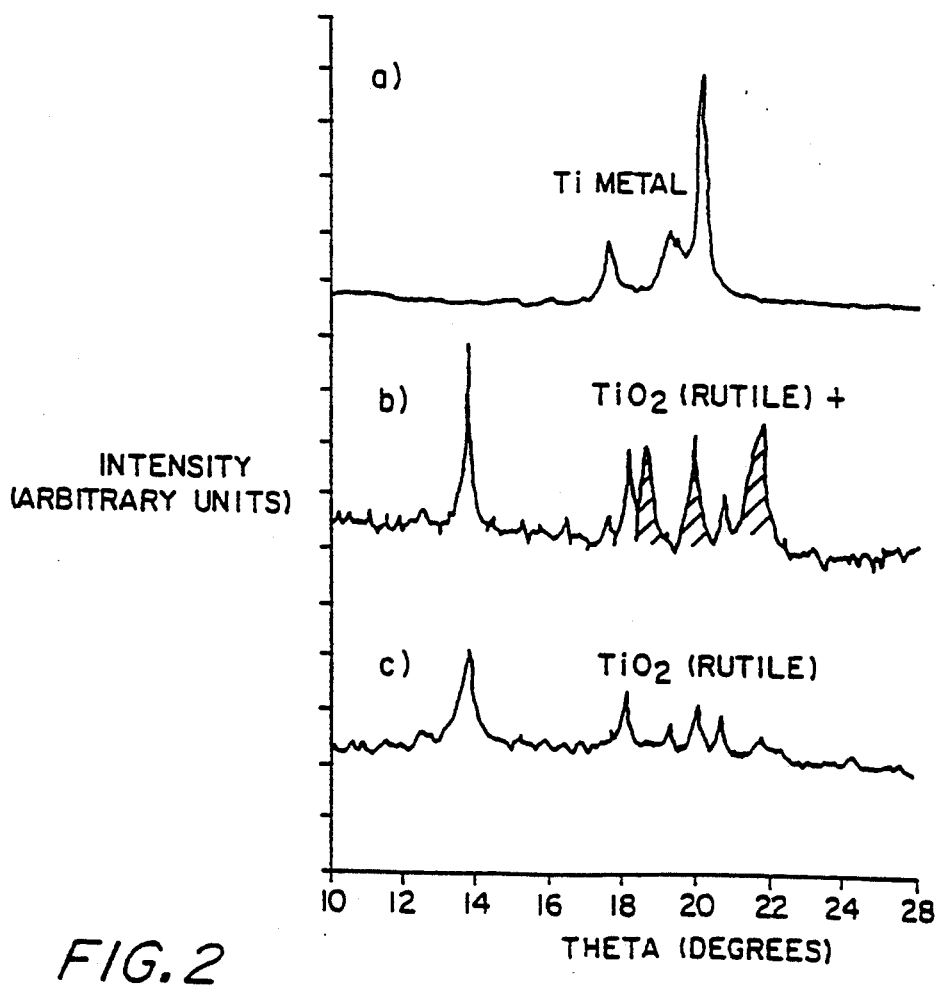
FIG. 2 illustrates X-ray plots of nanocrystalline (nanophase) material compacted using 1.4 GPa at ambient temperatures

If oxygen gas is rapidly introduced to the vacuum chamber 12 after evaporation of titanium in 500 Pa of helium gas pressure, the resulting oxidized phase is a nanocrystalline rutile with a nominal particle size of about 12 nm. The powdered, uncompacted rutile material has a characteristics bluish white color. On the other hand, as stated hereinbefore if the helium pressure in the vacuum chamber 12 is between about 10-500 Pa, an amorphous titanium oxide phase is formed. Electron energy loss spectroscopy confirms that the amorphous material contains substantial oxygen. Also, in general the titanium material collected on the cold surface 20 is gray in color when using a helium gas atmosphere pressure below about 500 Pa. This color remains the same before and after oxidation when using oxygen gas. Other factors determining the final phases of titanium oxide include the order in which oxidation takes place, and the type of gas (for example, helium, oxygen or air) present during compaction of the collected titanium powder material. If the original powder material is produced using helium pressures greater than about 500 Pa, the nanocrystalline material is still the same phase (for example, rutile if the powders have been exposed to oxygen and titanium metal if no oxygen or air exposure has occurred). However, if the powders are amorphous after air or oxygen exposure and the helium pressure is about 10-500 Pa helium pressure, the result is a bulk crystalline titanium oxide powder. The nature of the crystalline phase, however, depends on whether or not the powder material was exposed to oxygen prior to compaction. Powder material compacted in vacuum in the apparatus 10 without prior exposure to oxygen contained only crystalline titanium metal with a grain size of 20-50 nm. This is significantly larger than the grain size obtained if a 500 Pa helium pressure is used in the apparatus 10, even though a lower pressure level is generally expected to result in a smaller grain size. If, however, the powder titanium oxide material is exposed to oxygen, and the oxygen gas is subsequently removed prior to scraping powders from the cold surface 20, the compacted titanium oxide powder material undergoes a further oxidation reaction upon exposure to air. The resulting titanium oxide material is a mixture of rutile and at least one other oxide phase (see FIG. 2).

Figure 3:
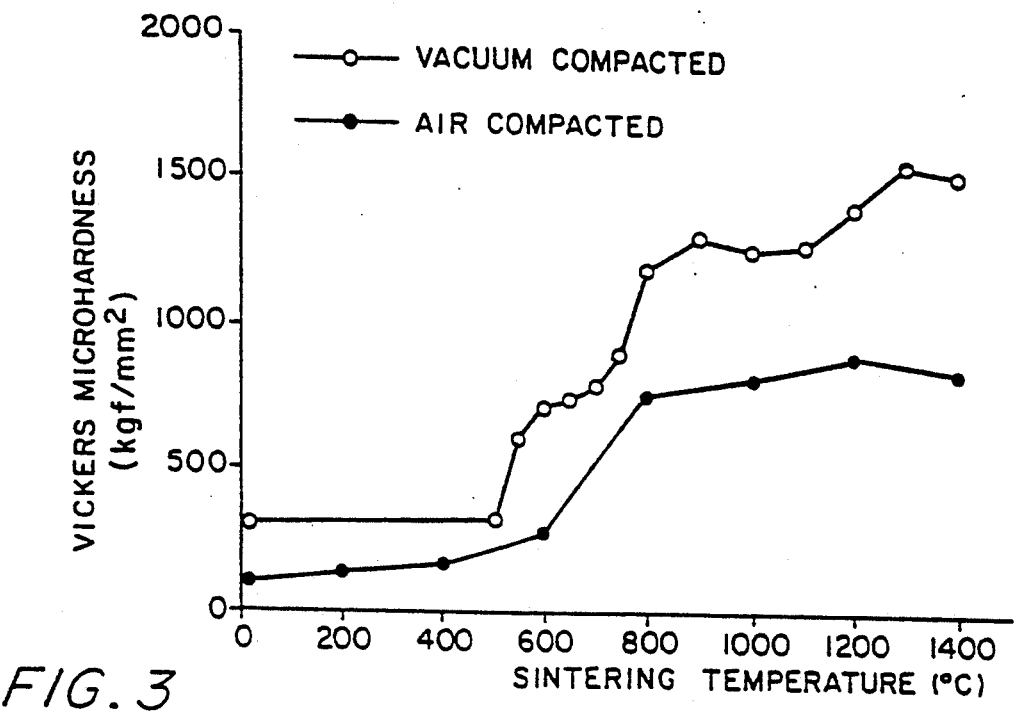
FIG. 3 illustrates Vickers microhardness of 12 nm average grain size rutile measured at room temperature; the specimens have undergone cycles of half hour sintering at successively higher temperatures in air; open circles illustrate results for vacuum compacted material with no exposure to air and closed circles illustrate results for air compacted materials.

Control of gas atmosphere conditions in the vacuum chamber 12 can allow the manufacture of titanium oxide material made up of different phases have different physical, chemical and electronic properties. For example, not only can one selectively generate a generally desired chemical phase, but one can control certain chemistry of the powder materials. This latter point can be illustrated for the case of nanocrystalline titanium oxide. In FIG. 3 there is shown a comparison of the microhardness sintering behavior of nanocrystalline titanium oxide powder with and without exposure to air prior to an initial low pressure powder compaction. Not only does the vacuum consolidated material begin sintering at lower temperatures than air consolidated material, but also the ultimate hardness obtained is greater than the air compacted material. The ability to control such characteristics as hardness and sinterability, in addition to the phases present, allows the manufacture of product materials having predetermined physical, chemical and electronic properties. Such controlled variability of characteristics arises from the different chemical phases produced and the surface chemical states being present as a consequence of varying the gas pressures experienced by the nanocrystalline material and the other general processing conditions, such as the compaction conditions. These features enable assembly of a component having portions with different chemical compositions and different structures. The assembled component can involve various generic nanocrystalline materials, such as, for example, composites of titanium oxides, zinc oxides, magnesium oxides, aluminum oxides and metals as well.

Further useful characteristics of nanocrystalline materials include controllable porosity in ceramic, metallic or composite materials. For example, nanocrystalline titanium was prepared in the manner described hereinbefore by evaporating the titanium from resistance heated tungsten boats at temperatures of 1550°–1650° C. into a 300–700 Pa helium atmosphere. The titanium material collected on the cold surface 20 was oxidized to titanium oxide (rutile) by rapid introduction of 2000 Pa of oxygen. The resulting rutile material was scraped from the cold surface 20, compacted and then specimens were sintered in air at 550° C. at times of 15 minutes, 30 minutes, 1 hour, 2 hours, 4 hours, 8 hours and 23 hours. Characterization of rutile grain size and void content were performed by small angle neutron scattering in the Argonne National Laboratory IPNS facility, and it was concluded that the rutile grain size was in the typical nanometer size range. The grains were separated by 0.5 nm boundaries which contained voids with the grain boundary rutile having a density of about 60–70%.

The level of density can thus be controlled by sintering and compacting to achieve a desired degree of microscopic and/or atomistic density ranging from the as produced state up to substantially theoretical density. Such control allows freedom to fix, for example, (1) the diffusion properties of a material, (2) the hardness, (3) strain rate sensitivity and (4) surface area and surface chemical states. Regarding diffusion properties, the substantial increase in grain boundary surface area and void or pore content in nanocrystalline materials also enhances diffusion properties. Such properties are important, for example, for (1) electrical and optical properties, (2) and (3) mechanical and wear properties and (4) catalytic properties, respectively. See the Examples for further amplifying information on these properties.

Figure 4:
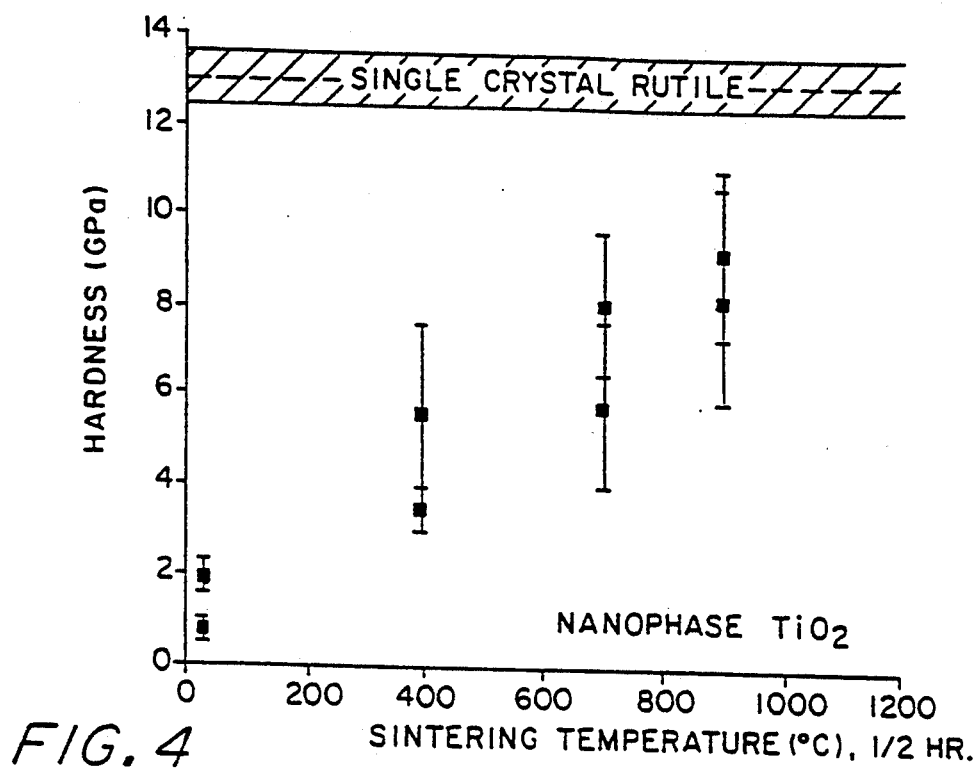
FIG. 4 shows nanoindenter-derived hardness of nanocrystalline (nanophase) rutile as a function of sintering temperature compared with nanoindenter hardness for a single crystal rutile wherein hardness is tested at two sites for each sample.

Based on the measurements shown in FIG. 4, the hardness of nanocrystalline rutile shows a steady, substantially linear increase with sintering temperature. This tread indicates that sintering and densification processes are taking place even at quite low temperatures. Such a result is believed to be unexpected since previous studies have indicated that density changes do not begin to occur until about 600° C. Nevertheless, it should be remembered that the first stage of sintering involves formation of inter-particle necks without a concurrent decrease in pore volume. Thus, at relatively low sintering temperatures, such as less than 600° C., the interconnections between particles would lend strength to the ceramic while not affecting the overall density. At these same temperatures, increases occur in Young's modulus; and changes in strain sensitivity are also observed (see FIGS. 5 and 6) further supporting the conclusion that microstructural changes are occurring. Enhanced diffusion at these low temperatures is also confirmed by the substantially improved diffusivity of platinum (see FIG. 7) into nanocrystalline rutile at temperatures as low as about 150°–200° C. (also see Example 6). Diffusion at such low temperatures is believed to occur along the surfaces of microscopically fine pores typically found in nanocrystalline rutile, but it is not inconceivable that self-diffusion can also proceed by a similar route at low temperatures.

Figure 5A:
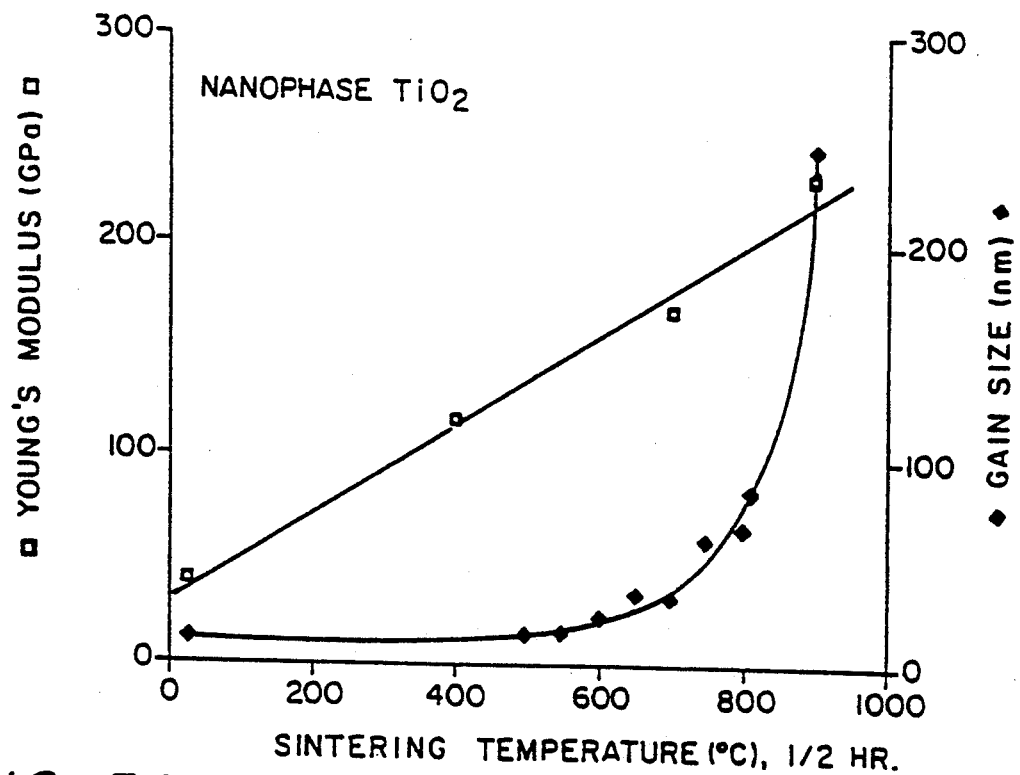
FIG. 5A illustrates Young's modulus data and grain growth for nanocrystalline (nanophase) rutile at different sintering temperatures and FIG. 5B shows the correspondence between hardness and Young's modulus in nanocrystalline (nanophase) rutile and single crystal rutile.
Figure 5B:
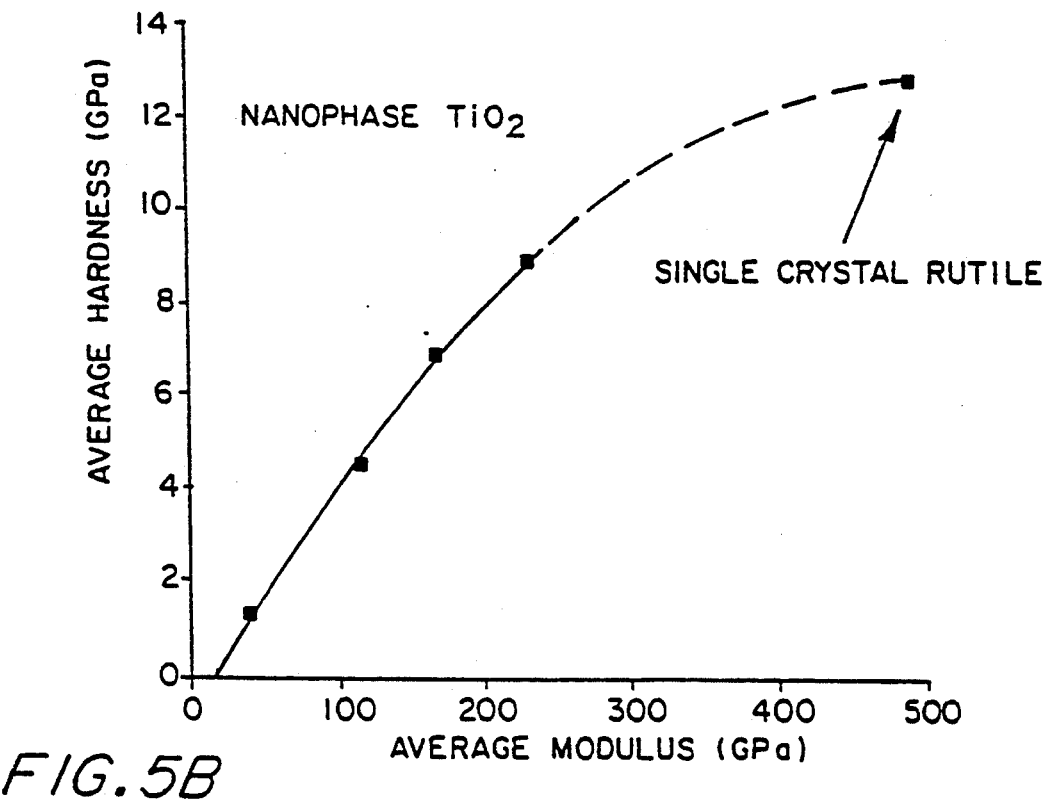

As illustrated in FIG. 5, Young's modulus does not reach the single crystal value but obtains about 47% of that value at 900° C. sintering temperature. The modulus appears to rise almost linearly with sintering temperature, indicating that some degree of sintering is occurring even at the lowest temperatures of the study. The independent measure of hardness and modulus in FIGS. 5A and 5B support the proposition that densification processes are indeed occurring in a monotonic manner. Consequently, while densification may be occurring at temperatures below 600° C., grain growth is relatively slow at these same temperatures (see FIG. 5A); and catastrophic, substantial grain growth does not occur until about 875° C. Therefore, one can consolidate these powders into a substantially dense ceramic state, while maintaining the nanocrystalline Particle size. As can be seen in FIG. 5A one can keep the grain size to less than about sixty to seventy nm at sintering temperatures of 800° C. for one half hour. In a conventional manner one can utilize known relationships of time-temperature-transformation to establish different temperatures and time combinations which will avoid catastrophic grain growth.

Figure 6A:
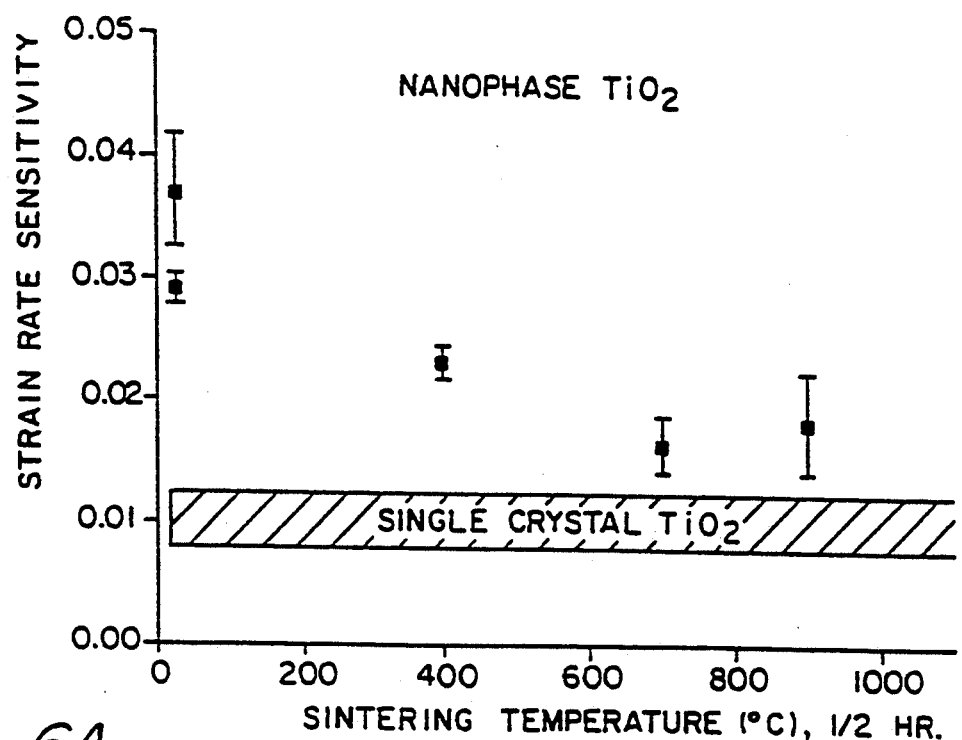
FIG. 6A illustrates strain rate sensitivities of nanocrystalline (nanophase) rutile with the range of strain rate sensitivities measured for single crystal rutile shown by the gray band.
Figure 6B:
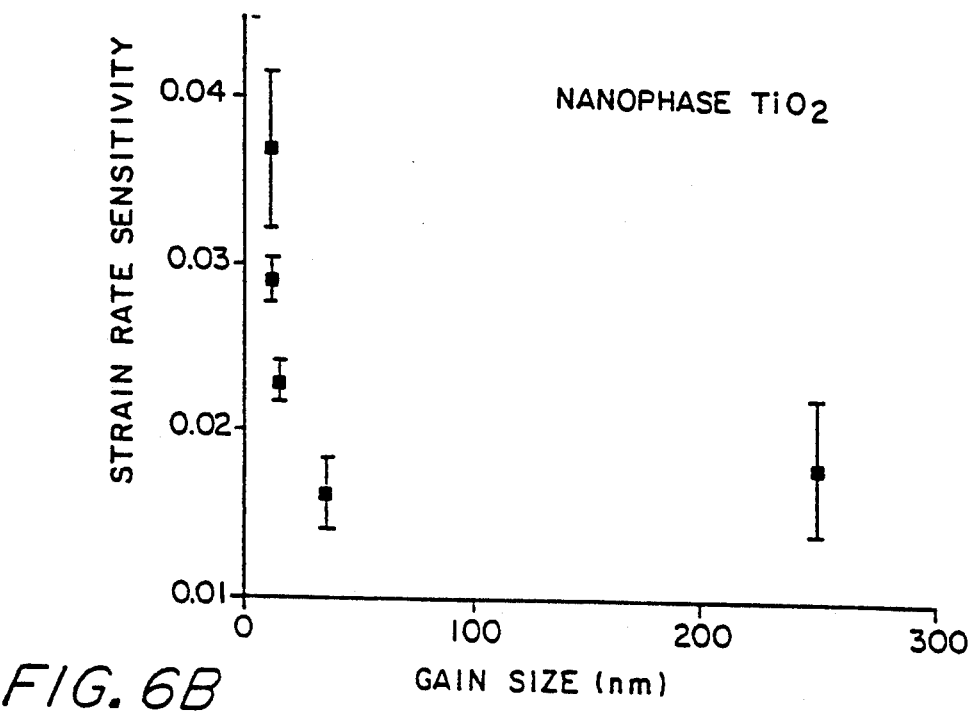
FIG. 6B shows strain rate sensitivity versus grain size in nanocrystalline (nanophase) rutile wherein grain size was determined from the data of FIG. 5A.

As shown in FIGS. 6A and 6B, the nanocrystalline rutile shows extremely high strain rate sensitivities indicating a potential for excellent room temperature ductility. The degree of strain rate exhibited is not found in conventional ceramic materials. This may arise for a number of possible reasons, none of which limit the scope of the claims presented hereinafter. These possibilities include increased grain boundary sliding activity, perhaps derived from the significant porosity (which is up to about 25% for an as compacted sample), and the ultrafine grain size should enhance grain boundary sliding activity.

In other forms of the invention one can carry out conventional chemical oxidation reactions to convert any metal into its oxidized state. Any oxidizable metal which can be deposited on the cold surface 20, or entrained in the condensing gas, can be converted by generic oxidation into its oxidized form. Such generic oxidation reactions can thus, for example, involve gas atmospheres of halogens, carburizing atmospheres such as $CH_4$, nitriding atmospheres such as N and $NH_4$ and sulphurizing atmospheres such as S or $H_2S$. The conventional nature of such generic oxidation reactions is illustrated in such texts as, *College Chemistry*, L. Pauling, W. H. Freeman and Co., San Francisco, 1957. It has long been known that generic oxidation-type reactions between elements well separated on the electronegativity scale (see Linus Pauling's *College Chemistry*), form well bonded compounds. Thus, the illustrated oxidation reactions already used in synthesizing nanophase ceramics are readily generalized to a wide range of other compounds, such as BN, formed from constituents sufficiently separated on the electronegativity scale by a fully analogous process to that already used.

While preferred embodiments of the present invention have been illustrated and described it will be understood that changes and modifications can be made within without departing from the invention in its broader aspects. Various features of the invention are defined in the following nonlimiting examples and the claims.

EXAMPLES

Example 1

Titanium dioxide has been prepared using titanium metal (99.9% purity) evaporated to form small titanium particles which are condensed in selected helium gas atmospheres described in the specification. The titanium is collected on a cold surface 20 and then oxidized by introducing approximately 2000 Pa oxygen rapidly into the vacuum chamber 12. During collection of the titanium particles on the cold surface 20, adequate quantities are built up before the material is oxidized and removed, or consolidated. Once adequate material is accumulated on the cold surface 20, it is warmed to room temperature and then spontaneously converted to titanium oxide by the oxygen atmosphere. Additional runs were made in which the cold surface 20 was not warmed to room temperature, and the same results were achieved. The rate of oxygen introduction into the chamber has been found to play a role in the form of oxides obtained. For example, bleeding oxygen slowly into the chamber results in the formation of a mixture of rutile and other oxides phases compared to rutile only for rapid introduction of oxygen. Following oxidation, the vacuum chamber 12 is evacuated again, and the titanium oxide powder is collected and consolidated under various atmospheric conditions, such as vacuum and selectively with oxygen and/or air. The resulting material has a log-normal grain size distribution with a typical mean grain size of approximately 12 nm. For oxides of aluminum and magnesium, which are extremely reactive with oxygen, a thin protective amorphous coating can be formed under certain conditions, and this layer can prevent complete oxidation of the metal. Because of this it has been necessary to perfect variations on the basic technique to form nanocrystalline oxides of highly reactive metals, such as, aluminum and magnesium. These techniques will be described in additional examples hereinafter.

Example 2

In the case of preparation of nanocrystalline aluminum oxide, nanocrystalline aluminum powders are first produced in substantially the same manner as titanium in Example 1, although it is unnecessary to include any helium atmosphere. After the nanocrystalline aluminum is collected on the cold surface 20, it is then annealed in air at 1000° C. for at least one to two hours. This treatment results in transformation of the nanocrystalline aluminum powders (likely with a very thin oxide coating) to the thermodynamically stable alpha phase of aluminum oxide. Little increase in particle size occurs during the annealing process, and the final average particle size obtained is about 18 nm.

Example 3

Nanocrystalline magnesium oxide has been produced by directly subliming the oxide by Joule heating of MgO in tungsten boats heated to 1600° C. in a 200 Pa atmosphere of helium. The nanocrystalline material which is collected on the cold surface 20 is oxygen deficient, but is fully converted to nanocrystalline MgO by oxygen subsequently introduced into the vacuum chamber 12. The MgO as produced has an approximate grain size of about 5 nm, but it has been determined not to be pure single phase MgO due to contamination by sublimation of tungsten oxide phases from the tungsten boat used to hold the MgO. Such a composite, however, can have well defined and desirable applications. Production of uncontaminated MgO can be obtained by careful electron beam evaporation, laser beam ablation or high rate sputtering. Details of preparation of substantially stoichiometric, pure MgO using an oxidizing atmosphere are set forth in Example 9.

Example 4

The production of nanocrystalline zinc oxygen is similar to that of MgO. As in the case of MgO, ZnO has a high vapor pressure at temperatures well below the melting point, and it is thus possible to produce nanocrystalline powders of zinc oxides by Joule heating. Nanocrystalline zinc oxide material with grain sizes of roughly 6 to 15 nm have been produced by subliming coarse grained ZnO from graphite boats at temperatures of 1400° C. in a $10^{-6}$ Pa vacuum. X-ray diffraction measurements reveal that the as produced and consolidated samples not only include ZnO, but some significant quantities of Zn metal are also produced. This result is observed even if the powder has been exposed to oxygen prior to compaction. In some cases only Zn is observed in X-ray scans, but some amorphous oxide phase also is present in the samples (chemical analysis has shown that these materials typically contain 40 at.% oxygen) Annealing of the material in air at 300° C. for 3 hours has been found to successfully convert any remaining Zn metal to ZnO. The end product was examined by X-ray diffractometry scans. It was noted that material which is only lightly compacted at very low pressures (less than roughly 0.5 GPa) transforms much more easily to ZnO than material which has been compacted at 1.4 Pa. The higher pressure compaction results in some Zn metal remaining even after several hours at 600° C. (above the melting point of Zn metal and presumably the Zn is passivated by ZnO). Other methods of producing a substantially stoichiometric ZnO using oxidizing atmospheres are set forth in Example 10.

Example 5

Raman microprobe studies were carried out on nanocrystalline titanium oxides and oxidation induced spectral changes were observed. Raman measurements can show that both rutile and anatase phases were present in the examples. The anatase phase could be completely removed from the specimen by annealing at temperatures above about 600°-750° C. for two hours in air. The spectrum showed the as compacted material contained the anatase phase peak which disappeared after the anneal. That is, the 144 cm$^{-1}$ and 154 cm$^{-1}$ peaks of anatase diminished, leaving only the rutile lines. In addition, it was noted that the phase transformation (anatase to rutile) temperatures and times were reduced in these nanocrystalline materials. Further, the oxygen deficiency present in the nanocrystalline titanium oxide is removed by the annealing operation in air, as revealed by the sharpening and shifting of the rutile and anatase lines in the Raman spectrum.

Example 6

Figure 7A:
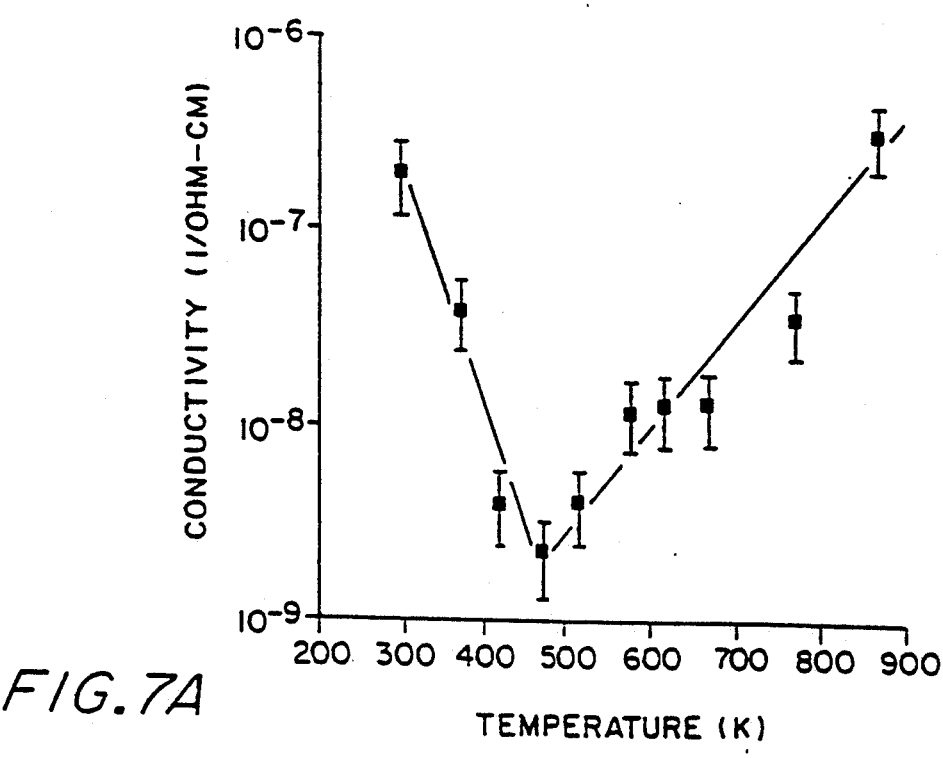
FIG. 7A shows the range of conductivity of Pt doped nanocrystalline rutile and FIG. 7B illustrates the spatial distribution of the Pt in the rutile based on Rutherford back scattering analysis.
Figure 7B:
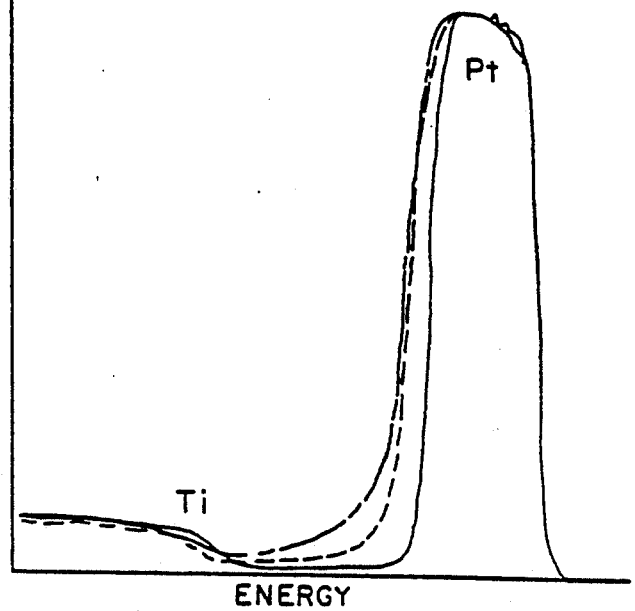

Pt was diffused into nanocrystalline rutile Prepared in accordance with Example 1. A 100 nm Pt layer was deposited by evaporation onto the rutile and annealed at 200° C. for two hours and then at 400° C. for another two hours. The conductivity of the doped rutile is illustrated in FIG. 7A, and the spatial distribution of the Pt in the doped rutile is clearly shown by the Rutherford back scattering data shown in FIG. 7B.

Example 7

The apparatus 10 shown in FIG. 1 has also been used to prepare nanocrystalline Pd and Cu. Mean grain size can be controlled in a known manner by the conditions of atom removal, such as by the evaporation temperature and by the inert gas atmosphere pressure. The powder produced is compacted under 1.4 Pa uniaxial pressure in vacuum (typically 10$^{-6}$ Pa) to form samples for mechanical testing. In particular mechanical properties have been improved by reducing the mean grain size to less than 10 nm. The Archimedes method in ethyl phthalate was used to measure densities of a compacted specimen. These densities ranged from 82% to 96% of the coarse grained standard and were reproducible within 2%. Pd samples averaged 5-10 nm grain size and Cu was 25-35 nm.

Vickers microhardness measurements were made on as-compacted and polished samples using a one hundred g load applied for twenty seconds. Measurements were made on the nanocrystalline Pd samples, two nanocrystalline Cu samples, and several coarse grained Pd/Cu samples. Three nanocrystalline and two coarse-grained palladium samples were annealed in vacuum (0.13 Pa) for 100 minutes at each temperature, incremented by 100° C. from 200° through 100° C. Microhardness was measured on unpolished surfaces of small fragments (0.2 mm×2 mm×4 mm), derived from the original pellets, at room temperature after each anneal. The small size of the samples used did not permit grain size determination by X-ray diffraction after each anneal. Grain size and hardness of a single sample were determined prior to and following vacuum annealing at 500° C. for 100 minutes in order to estimate the hardness change and grain growth due to annealing.

Figure 8A:
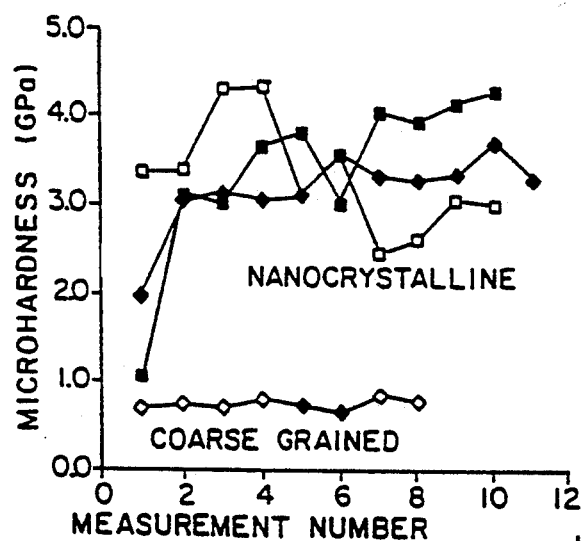
FIG. 8A shows microhardness of three representative nanocrystalline Pd samples and a coarse-grained Pd sample; low measurement 1 is from a low-compacted rim.
Figure 8B:
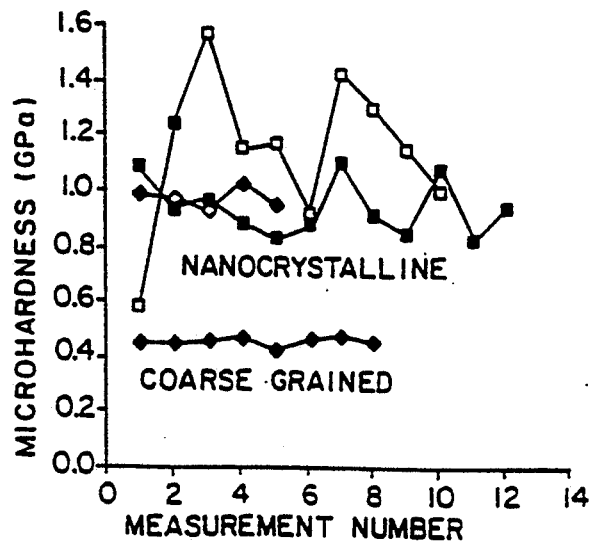
FIG. 8B shows microhardness of two nanocrystalline Cu samples and a coarse-grained Cu sample; data includes two traverses of one sample; low measurement 1 is from a low-compacted rim.

Microhardness results on as-compacted palladium samples show a four fold increase in hardness for ten nanocrystalline Pd samples compared to coarse-grained (100 μm) Pd (FIG. 8A), and a doubling in hardness for two nanocrystalline Cu samples over coarse-grained (50 μm) Cu (FIG. 8B). Measurements on low-compacted rims yield much lower hardness values, as shown. The magnitude of the increase in hardness of the nanocrystalline samples over that of the coarse-grained samples agrees with data for increase in yield strength determined by uniaxial tensile tests on the same samples. Hardness for the as-compacted nanocrystalline Pd samples ranged from 4.3 GPa to 2.3 GPa with a mean of 3.1±0.5 GPa. Mean microhardness for a coarse-grained Pd sample (100 μm) was 0.74±0.05 GPa. Microhardness determined for a set of samples polished to 0.25 μm gave a mean hardness of 2.9±0.1 GPa. Microhardness for a 25 nm grain size Cu sample was 1.2±0.2 GPa (1.2±0.1 GPa for the polished sample), and was 0.9±0.04 GPa for a 35 nm grain size sample (1.0±0.09 GPa for the polished sample). Mean microhardness for a coarse-grained (50 μm) Cu sample was determined to be 0.45±0.04 GPa. Polishing was observed to dramatically reduce variance in the measured hardness without affecting the mean hardness.

Figure 8C:
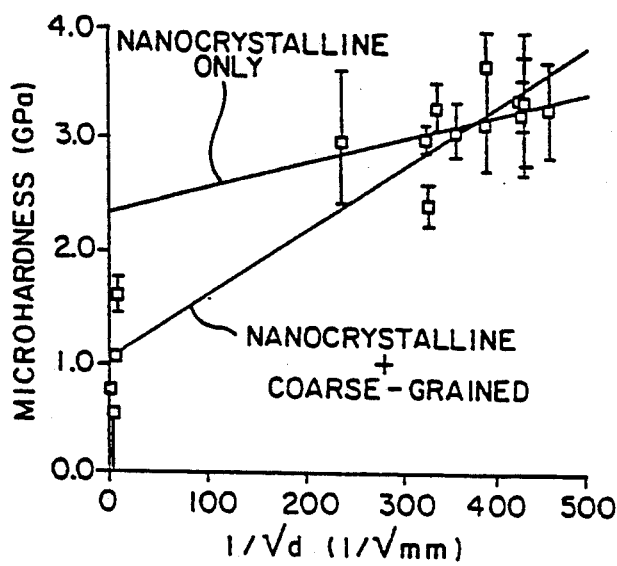
FIG. 8C shows microhardness of eleven nanocrystalline Pd samples and four coarse-grained Pd samples versus $1\sqrt{d}$.

For pyramidal indenters, hardness ($H_v$) of metals is empirically related to the yield stress ($\sigma_y$) by the relation $H_v/\sigma_y=3$. If the Hall-Petch relationship persists to nanocrystalline grain sizes (d), then $$H_v = H_{vo} + k_{Hv} d^{-\frac{1}{2}},$$

where $k_{Hv}$ and $H_{vo}$ are constants. The present investigation of the relationship between Vickers microhardness and crystalline size shows that [1] the increase in hardness as a function of $d^{-\frac{1}{2}}$ is smaller for the group of nanocrystalline samples alone than for coarse-grained and nanocrystalline samples taken together; and [2] the large variance in the data results in a considerable uncertainty in the slope, $k_{Hv}$ (FIG. 8C). The best-fit straight line through the data points for eleven nanocrystalline Pd samples, two originally nanocrystalline samples coarsened at 1000° C., and for two coarse-grained Pd samples is $H_v=1030$ MPa+6 (MPa/mm) $d^{-\frac{1}{2}}$. The best-fit straight line though only the nanocrystalline data is $H_v=2236$ MPa+2.5 (MPa√mm) $d^{-\frac{1}{2}}$. The uncertainty in these lines due to scatter in the nanocrystalline data is apparent. Possibly more reliable values for $H_{vo}$ and $k_{Hv}$ are obtained by plotting mean microhardness of polished samples or maximum hardness of as-compacted samples as a function of $d^{-\frac{1}{2}}$. Values of $H_{vo}$, $k_{Hv}$ are 834 MPa, 5 MPa mm for polished, as-compacted samples and 755 MPa, 8 MPa mm for the maximum hardness data. Mean microhardness for each of 11 Pd samples ranging in grain size from 5 to 18 nm shows a small apparent increase in hardness with decrease in grain size, but the mean of the standard deviations of the samples (441 MPa) is large enough to make all of these hardness values overlap. Microhardness measurements on the two nanocrystalline Cu samples indicate the 25 nm Cu is harder than the 35 nm Cu, but these data, too, overlap statistically.

Failure to define clearly the dependence of microhardness on nanocrystalline grain size results, in part, from the fact that changes in indentation diagonal length due to grain size-related hardness differences are of the same order of magnitude as the uncertainties in the measurements. For example, a Vickers hardness of 4.9 GPa results in a diagonal length of ≈19.1 μm. A hardness of 3.4 GPa corresponds to a diagonal length of ≈23.0 μm. Processing flaws much larger than the mean grain size, such as pores and cracks, are probably responsible for reducing and homogenizing hardness values. The measured microhardness is a net hardness, representing both grain strength as well as flaw strength, so the lower stress necessary to crush or propagate such flaws will tend to reduce the hardness of the sample. Hardness values for the <10 nm size samples span a very large range. The maximum hardness values ($\approx$4.9 GPa) could represent the hardness of relatively flaw-free material; the lower hardness ($\approx$2.45 GPa), of flaw-rich material. Thus, the measured bulk sample hardness could be much lower than the hardness due to grain size reduction. However, ultimate hardness may be partly ameliorated by inherent softening due to grain boundary sliding.

Figure 8D:
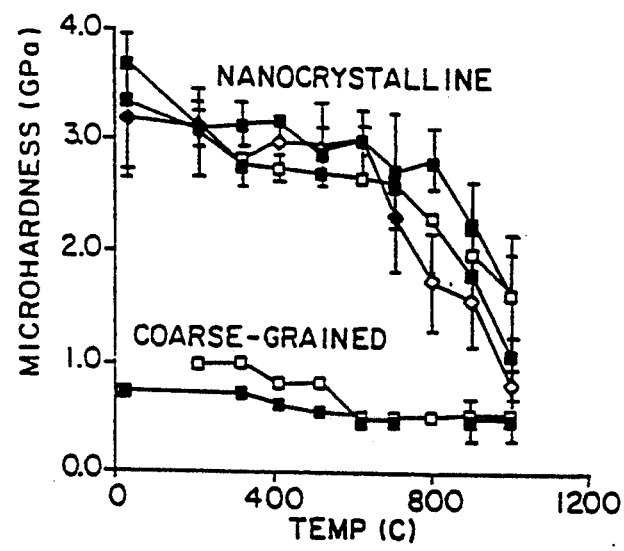
FIG. 8D shows microhardness of three nanocrystalline Pd samples and two coarse-grained Pd samples as a function of annealing temperature; all the samples were annealed for 100 minutes in 0.16 Pa vacuum.

Microhardness also was investigated as a function of annealing temperature, and results are shown graphically in FIG. 8D. Two nanocrystalline Pd samples show small mean hardness drops during the initial 200° C. anneal. However, the standard samples and the third nanocrystalline sample do not change mean hardness in this range, and hardness variation is large. Mean hardness of nanocrystalline Pd decreases slowly for temperatures between 200 (0.26 $T_m$) and 700° C. (0.53 $T_m$), then declines rapidly at a rate of approximately $-50$ MPa/100° C., as determined by the average slope of the mean $H_v$ vs temperature data for three samples. The standard samples decrease in hardness slowly between 300° C. and 600° C., then show little change. The standard deviation in the hardness measurements of the nanocrystalline samples is much larger than that of the standard grain size samples. For a sample annealed in vacuum only at 500° C. for 100 minutes the mean grain size increased from 8 to 18 nm while microhardness was 3.1±0.3 GPa and 3.0±0.6 GPa, respectively. Grains observed optically after the 1000° C. heat treatment range widely in size with a mean value of approximately 16 μm. The hardness data for the samples in FIG. 8D and for the sample annealed only at 500° C. therefore indicate that hardness decrease corresponds to grain coarsening. Further, this effect occurs mainly above 0.5 $T_m$.

The apparent drop in mean hardness from the as-compacted values after the 200° C. anneal in the two nanocrystalline samples could arise from the annealing out of strains introduced by the compaction process, since large internal stresses resulting from compaction would increase the hardness. Alternatively, it may indicate that some annealing of intra-grain defects has occurred, reducing sites that could inhibit dislocation motion. Sintering of coarse porosity would increase the hardness, as shown by annealing studies on nanocrystalline $TiO_2$.

Nanocrystalline Pd samples (5-10 nm grain size) evaluated by Vickers microhardness measurements therefore show a surprising four fold increase in hardness over coarse-grained samples (100 μm), and nanocrystalline Cu samples (25-35 nm) likewise show a rather surprising doubling of hardness over coarse-grained Cu (50 μm). Increases in yield strength of the same magnitude were found in tensile tests on the same samples.

When microhardness data are plotted against $d^{-\frac{1}{2}}$, a much flatter slope is found for nanocrystalline samples alone than for coarse-grained and nanocrystalline samples combined. Study of microhardness versus annealing temperature suggests that grain growth is slow in the nanocrystalline samples up to a temperature of approximately 0.5 $T_m$, since mean microhardness changes very little. At higher temperatures a decrease in hardness is interpreted to be the effect of grain growth. Interpretation of the small slope of the $H_v$ vs $d^{-\frac{1}{2}}$ data for nanocrystalline samples, as well as the small decrease of the mean microhardness data with annealing up to 0.5 $T_m$, is made more difficult due to statistical variability and inhomogeneity of hardness, which mask small variations. It is likely that microhardness is strongly influenced by microstructural processing flaws that control the upper limit of hardness of the samples until the point at which grain size becomes comparable to flaw size. It is possible that as particle size decreases to the size of several dislocation core diameters, "normal" dislocation processes responsible for Hall-Petch effects in larger grains no longer operate, or that grain boundary sliding becomes active.

Example 8

In the area of tensile strength and creep properties, uniaxial tensile tests and constant load creep tests were performed at room temperature on nanocrystalline Pd prepared in the apparatus 10. It is know that metals with mean grain sizes in the micrometer size range show a well-defined dependence of yield stress and flow stress on grain size. For found to follow the Hall-Petch relation, $$\sigma_y = \sigma_o + kd^{-\frac{1}{2}}$$

where $\sigma_o$ is the friction stress, and k is a constant representing the stress to propagate dislocation activity into an adjacent grain. At low homologous temperatures, the Coble relation for the creep rate $\dot{\epsilon}$, $$\dot{\epsilon} = \frac{B\sigma\delta\Omega D_b}{d^3 kT}$$

gives the predominant diffusional creep rate, where B is a constant, $\sigma$ is applied stress, $\delta$ is the boundary thickness, $\Omega$ is the atomic volume, and $D_b$ is the boundary diffusion coefficient. Thus, in nanocrystalline materials creep rates are enhanced by a factor of $10^9$ over those for micrometer grain size materials. A reported increase in diffusivity in nanocrystalline Cu over the normal grain boundary value would further enhance the creep rate.

Pure Pd powders were prepared by inert-gas condensation and consolidated in a vacuum of approximately $1 \times 10^{-6}$ Pa using a uniaxial pressure of 1.4 GPa to form 9 mm diameter disks 185-460 m thick. Precision density measurements on this as-compacted Pd, using the Archimedes method in ethyl phthalate, gave densities ranging from 86% to 96% of a coarse-grained standard. Measured densities for a sample were reproducible within 2%. Samples were prepared for mechanical testing by electric discharge machining dogbone-shaped specimens 8 mm long with gauge sections of 2-3.5 mm. Mechanical polishing was used in an attempt to reduce or remove surface flaws, but the amount of polishing possible varied with the sample thickness. Samples were tested at room temperature in uniaxial tension using load control on a miniaturized servo-electric test apparatus, built to test these small specimens. The instrument uses a 445N capacity load cell to monitor load provided by a 110N force load source, and an LVDT with a 0.13 mm displacement capacity and 0.4 μm sensitivity to monitor displacement.

Figure 9A:
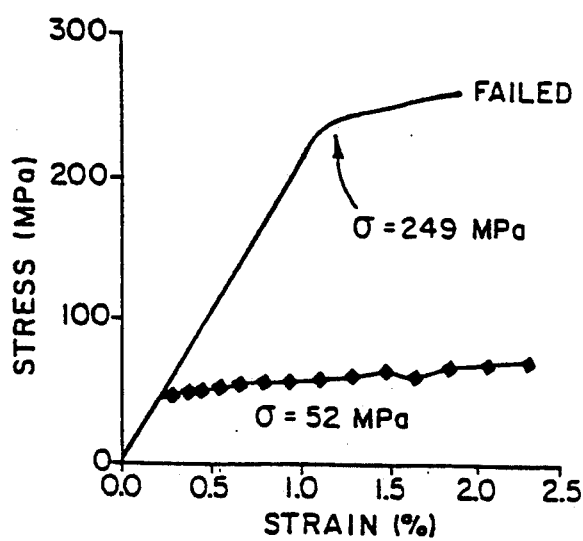
FIG. 9A shows a stress-strain curve for a nanocrystalline (average grain size 7 nm) sample and a coarse grained (100 μm grain size) Pd sample. $\dot{\epsilon} \approx 2 \times 10^{-5}/s$.
Figure 8E:
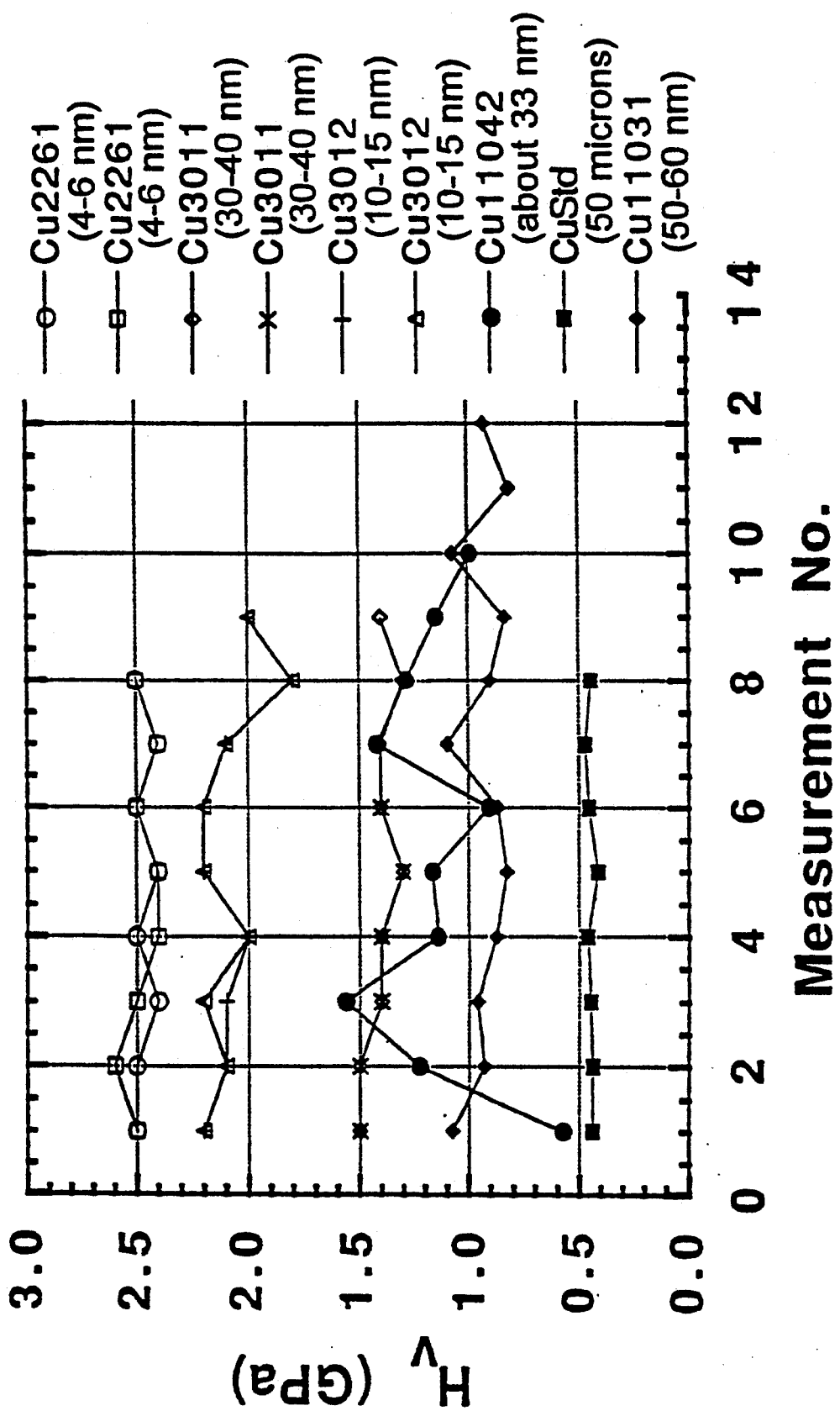
FIG. 8E shows Vickers microhardness of six nanocrystalline Cu samples and a coarse-grained Cu sample.
Figure 9B:
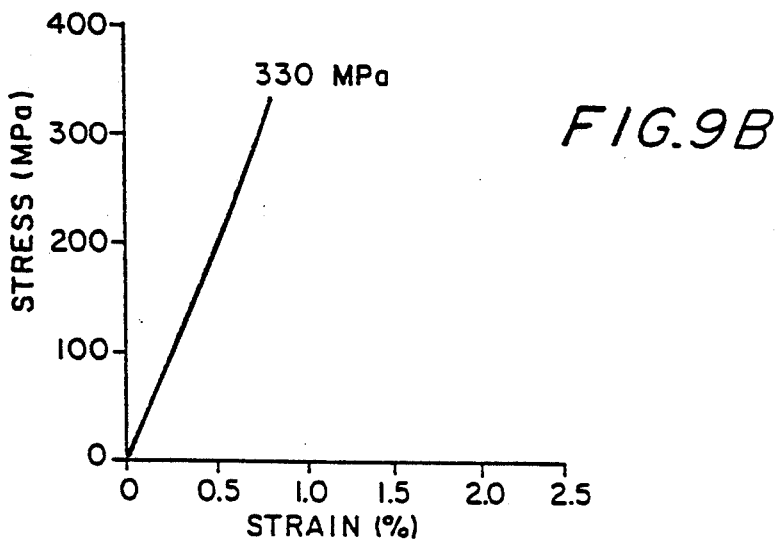
FIG. 9B shows a stress-strain curve for a nanocrystalline (10 nm) Pd sample. $\dot{\epsilon} \approx 2 \times 10^{-5}/s$.

We report here the results of two room temperature tensile tests (FIGS. 9A and B) and of two room temperature creep tests (FIGS. 9C and D) on samples of nanocrystalline Pd. For comparison, tensile test is reported for a sample of coarse-grained Pd(FIG. 9A). Note that measurements for the coarse-grained sample are affected by the large sizes of the grains with respect to the sample thickness and width, while the nanocrystalline sample tests give bulk-sample properties. The strain rate for all tensile test samples was approximately $2 \times 10^{-5}$/s. FIG. 9A shows results of tensile tests on a sample with a mean grain size of 7 nm and a coarse-grained sample. The nanocrystalline sample was polished using 6 μm silicon carbide to a thickness of 165 μm; the coarse-grained sample was polished to a thickness of 230 μm using 1 μm silicon carbide. The apparent 2% offset yield stress of the 7 nm Pd sample is five times larger than that of the coarse-grained sample. The nanocrystalline sample failed at a strain of 1.75% while the coarse grained sample did not fail before exceeding the displacement range of the LVDT. Fracture of the nanocrystalline sample of FIG. 9A occurred on an inclined surface composed of very flat plateaus and ledges. In contrast, FIG. 9B shows the stress-strain behavior of a 10 nm grain size Pd sample. This sample was polished with 0.25 μm diamond paste to a thickness of 190 μm, reducing the size of the remaining flaws below those in the previous sample. The sample in FIG. 9B showed no indication of yielding up to 330 MPa, the maximum capacity of the machine. The results in FIGS. 9A and B show the large increase in yield strength for nanocrystalline Pd samples relative to coarse-grained Pd. They also indicate a strong flaw size sensitivity, typical of many strong materials. Comparison of FIGS. 9A and B suggest that the yield stress for the 7 nm nanocrystalline sample is the critical stress for crack propagation and thus is an apparent yield stress. A large increase in hardness and a significant flaw sensitivity were also found in previous microhardness tests on these same samples.

The experimental values of Young's modulus for the three tensile samples vary from sample to sample and are far lower than the true modulus for Pd (122 GPa). In addition to the usual inaccuracy in measurement of this modulus from stress-strain cures, the displacement sensitivity of the LVDT prohibits accurate measurement of very small strains. The influence of bulk and surface flaws can also lower the apparent modulus.

Figure 9C:
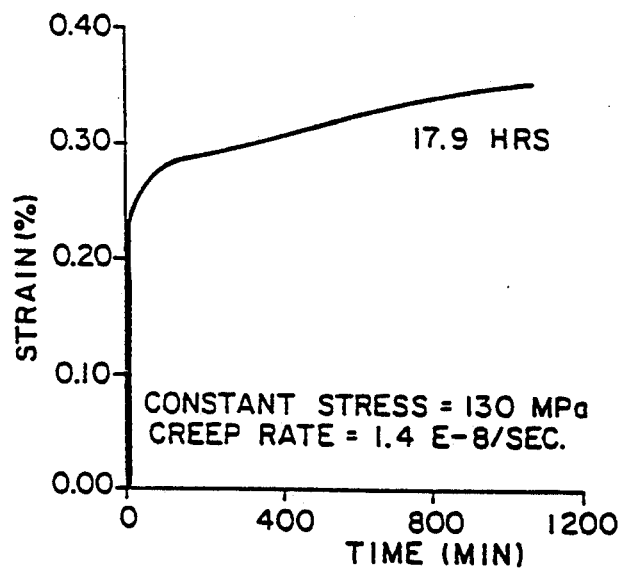
FIG. 9C shows a creep plot for constant stress, room temperature creep tests on a nanocrystalline (10 nm) Pd samples
Figure 9D:
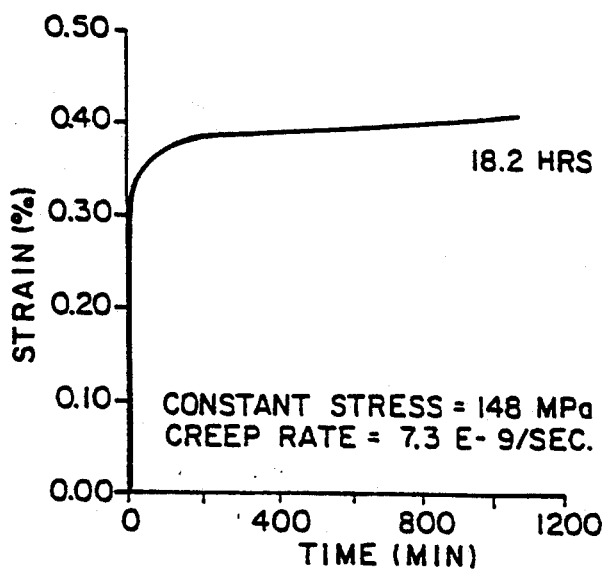
FIG. 9D shows a creep plot for constant stress and room temperature creep tests on a nanocrystalline (10 nm) Pd sample.

Calculations using known data of the diffusion (Coble) creep rate for 10 nm grain size Cu predict a diffusion creep rate at 298K under a stress of 100 MPa of $\geq 1 \times 10^{-5}$/s. To investigate the Possibility of appreciable diffusional creep in nanocrystalline Pd, room temperature creep tests were performed. A 10 nm grain size sample was polished to a gage thickness of 450 μm using 0.25 μm diamond paste prior to tensile testing. The sample was placed under a constant stress of 130 MPa for a duration of 17.9 hours. Temperature was not monitored, but it is unlikely to have varied by more than a few degrees during the test. The creep rate measured is $1.4 \times 10^{-8}$/s, and data for the test are shown in FIG. 9C. A second creep test on the same nanocrystalline Pd sample is shown in FIG. 9D. This test was run using a load of 148 MPa for a duration of 18.2 hours. The creep rate measured in the second test is $7.3 \times 10^{-9}$/s. Both creep rates are near the resolution of the test equipment. The observed creep rate of this Pd sample is three orders of magnitude smaller than that which might have been expected on the basis of conventional data. Negligibly small creep rates were also found from creep test on nanocrystalline copper.

Example 9

Nanocrystalline MgO was prepared in a manner similar to Example 3 except a mixture of helium and oxygen was used in the vacuum chamber 12. The MgO was sublimed from a tungsten boat with a base vacuum of about $10^{-6}$ torr. The temperature of the boat was about 1600°–1750° C., and the oxygen partial pressure was about 60-70 Pa and the helium pressure was about 650 Pa. During the evaporation, approximately 5 to 250 Pa of oxygen was injected every few minutes. The fully oxidized MgO which had accumulated on the cold surface 20 was then scraped and material collected in the vacuum chamber 12 at about $7 \times 10^{-7}$ torr. In order to insure correct MgO stoichiometry an additional 6500 Pa of oxygen was quickly injected, and this resulted in a strong exothermic reaction evidenced by a noticeable optical flash. In preparation of another nanocrystalline MgO specimen, the procedure was substantially the same except after scraping the collected material from the cold surface 22, and before compaction, the powder was exposed to $O_2$. The same general exothermic reaction occurred, accompanied by a flash of light. X-ray diffraction analysis showed the resulting products in both cases was MgO with some $WO_x$ contamination. The $WO_x$ contamination can be removed by use of other more focused evaporation techniques, such as laser ablation of MgO.

Example 10

Additional nanocrystalline zinc oxygen specimens were prepared in a manner similar to Example 4, but an oxidizing gas pressure ($O_2$) was added to enhance the formation of stoichiometric ZnO. After collecting the nanocrystalline zinc oxygen compound on the cold surface 22, 1300 Pa of $O_2$ was let into the vacuum chamber 12. The collected material changed from a black to a gray color. Precompaction of a pellet was quite successful using the low pressure compaction unit 26. The pellet was subsequently pressed in the high pressure compaction unit 34. Further, nanocrystalline ZnO was prepared in substantially the same manner described above but some additional $O_2$ was added during sublimation (about 100 Pa every ten minutes over the half hour of collection of zinc oxygen). The collected material was noted to turn from black to gray in color. Variations of these oxidizing atmospheres were used, including smaller amounts of 13 Pa of $O_2$ every five ten minutes causing formation of gray zinc oxide material with no color change when about 4000 Pa of $O_2$ was let into the vacuum chamber at the end of the run.

Example 11

Nanocrystalline $Al_2O_3$ has also been produced using a mixture of $O_2$ and helium during collection of material on the cold surface 20 of the apparatus 10. During evaporation of aluminum from a BN boat the temperature ranged from about 1000° C. to 1100° C., the helium gas pressure was at about 600 Pa and the $O_2$ pressure was about 200 Pa. The resulting material collected on the cold surface 20 was scraped, and it was determined by X-ray diffraction to be a substantial amount of aluminum remained unconverted to $Al_2O_3$.

Example 12

MgO was prepared in substantially the same way as in Example 9, but the $O_2$ pressure was maintained at about 260 Pa and helium at 650 Pa throughout sublimation. The temperature of the source MgO material was maintained at about 1600°–1700° C. with tungsten boat about 100°–150° C. hotter than the MgO source. A reaction did occur between MgO and $WO_x$ forming $MgO/WO_x$ compound with no evidence of insufficient oxygen (X-ray diffraction results).

Example 13

Nanocrystalline Si was prepared by evaporating by Joule heating at about 1500°–1600° C. electronics grade Si from a W boat. Helium pressures in the vacuum chamber of 550 Pa and 13 Pa were used in two runs. Initially the materials collected on the cold surface appeared lighter orange at thin layers, changing to orange and then black for thicker deposits. The Si prepared at higher pressure helium underwent an exothermic reaction (light flash) when exposed to oxygen but none occurred for the lower helium pressure run.

We claim:

1. A method of preparing a treated nanocrystalline metallic material, comprising the steps of:
   providing a starting nanocrystalline metallic material having a mean grain size less than about 35 nm;
   compacting said starting nanocrystalline metallic material in a selected inert atmosphere, said compacted metallic material having the mean grain size less than about 35 nm; and
   annealing said compacted metallic material at a temperature less than about one-half of the melting point of said metallic material.

2. The method as defined in claim 1 wherein said nanocrystalline metallic material is selected from the group consisting essentially of noble metals, transition metals and mixtures thereof.

3. The method as defined in claim 2 wherein said nanocrystalline metallic material further includes silicon as an additive thereto.

* * * * *

UNITED STATES PATENT AND TRADEMARK OFFICE
CERTIFICATE OF CORRECTION

PATENT NO. : 5,320,800
DATED : June 14, 1994
INVENTOR(S) : Richard W. Siegel et al.

It is certified that error appears in the above-identified patent and that said Letters Patent is hereby corrected as shown below:

| | |
|---|---|
| Column 1, Line 25, | cancel "Progress" and insert -- progress --; |
| Column 1, Line 47, | cancel "Provide" and insert -- provide --; |
| Column 6, Line 46, | cancel "Particle" and insert -- particle --; |
| Column 9, Line 56, | cancel "100°C." in the second occurrence, and insert -- 1000°C.--; |
| Column 11, Line 7, | cancel "< 10" and insert -- $\leq$ 10 --; |
| Column 12, Line 25, | after "For" insert -- materials with grain size d, yield stress $\sigma_y$, is --; |
| Column 13, Line 52, | cancel " $\leq$ " and insert -- $\geq$ --; |
| Column 13, Line 52, | cancel "Possibility" and insert -- possibility --; |

UNITED STATES PATENT AND TRADEMARK OFFICE
CERTIFICATE OF CORRECTION

PATENT NO. : 5,320,800
DATED : June 14, 1994
INVENTOR(S) : Richard W. Siegel et al It is certified that error appears in the above-indentified patent and that said Letters Patent is hereby corrected as shown below:

Column 14, line 52, before "ten" insert --to--.

Signed and Sealed this

Fourth Day of October, 1994

Attest:

BRUCE LEHMAN

Attesting Officer     Commissioner of Patents and Trademarks